(12) United States Patent  
Gullapalli et al.

(10) Patent No.: US 8,787,987 B2  
(45) Date of Patent: Jul. 22, 2014

(54) CONFIGURING OF VEHICLE COMMUNICATIONS MODULES

(75) Inventors: Subhash B. Gullapalli, Ann Arbor, MI (US); Dana B. Fecher, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 12/907,561

(22) Filed: Oct. 19, 2010

(65) Prior Publication Data

US 2012/0094657 A1   Apr. 19, 2012

(51) Int. Cl.
*H04M 1/00* (2006.01)
*H04B 1/38* (2006.01)

(52) U.S. Cl.
USPC ..................... 455/570; 455/569.1; 455/569.2

(58) Field of Classification Search
USPC ........ 455/422.1, 423, 424, 425, 426.1, 426.2, 455/41.2, 41.3, 556.1, 569.1, 569.2, 570, 455/575.9
See application file for complete search history.

(56) References Cited

U.S. PATENT DOCUMENTS

| | | | |
|---|---|---|---|
| 2002/0137505 A1* | 9/2002 | Eiche et al. | 455/425 |
| 2003/0105639 A1* | 6/2003 | Naimpally et al. | 704/276 |
| 2006/0168627 A1* | 7/2006 | Zeinstra et al. | 725/75 |
| 2006/0177017 A1* | 8/2006 | Abeta | 379/88.01 |
| 2010/0049516 A1* | 2/2010 | Talwar et al. | 704/251 |
| 2011/0014872 A1* | 1/2011 | Langham | 455/41.3 |

OTHER PUBLICATIONS

ITU-T P.56 "Objective Measurements of Active Speech Level, International Telecommunication Union, Mar. 1993".*

* cited by examiner

*Primary Examiner* — Magdi Elhag
(74) *Attorney, Agent, or Firm* — Anthony Luke Simon; Reising Ethington P.C.

(57) ABSTRACT

A system and method for configuring a vehicle user interface that provides hands-free use of a mobile communications device by a vehicle operator. First, the mobile communications device located at a vehicle is linked with a vehicle user interface in the vehicle so that the driver or other occupant can carry out hands-free telephone calls through the mobile device. Then, an evaluation phone call is placed using the mobile device so that volume levels, noise, etc. can be checked. Based on an analysis of that evaluation call, at least one audio parameter of the vehicle user interface is configured and is thereafter used to improve the audio communication between the user and the vehicle user interface.

20 Claims, 3 Drawing Sheets

CONFIGURING OF VEHICLE COMMUNICATIONS MODULES

TECHNICAL FIELD

The present invention relates generally to vehicle communications modules and, more particularly, to methods for configuring hands-free vehicle user interface modules.

BACKGROUND OF THE INVENTION

The use of a vehicle hands-free interface module provides a vehicle operator the ability to communicate via a mobile communications device without using its handset. However, this type of communications inherently experiences communications disturbances including noise, echo, and equalization disturbances which lower the quality of a mobile communication. These disturbances may vary depending on the mobile communications device used, acoustics of the vehicle audio interface, the communications network used, and other factors. Furthermore, this communication quality problem is complicated by the fact that there exists a wide variety of mobile communications devices which induce a variety of different communications disturbances.

SUMMARY OF THE INVENTION

According to one embodiment, there is presented a method of configuring a vehicle user interface that provides hands-free use of a mobile communications device by a vehicle operator, comprising the steps of (a) linking a mobile communications device located at a vehicle with a vehicle user interface in the vehicle; (b) placing an evaluation phone call using the mobile communications device; and (c) configuring at least one audio parameter of the vehicle user interface based on the evaluation call.

In another embodiment, there is presented a method of configuring a vehicle user interface that provides hands-free use of a mobile communications device by a vehicle operator, comprising the steps of (a) pairing a mobile communications device located at a vehicle with a vehicle user interface via a Bluetooth connection; (b) obtaining at least a mobile communications device identifier via the Bluetooth connection; (c) determining that the vehicle user interface has not been configured for the mobile communications device associated with the identifier; (d) placing an evaluation phone call between the mobile communications device and a telematics unit located in the vehicle, wherein the evaluation call is established using a cellular communications system; (e) sending first audio data from the mobile communications device over the cellular communications system and receiving the first audio data at the telematics unit; (f) sending second audio data from the telematics unit over the cellular communications system and receiving the second audio data at the mobile communications device; (g) analyzing the sent and received first and second audio data; (h) based on the audio data analysis, evaluating a plurality of audio parameter levels, and determining audio parameter settings based on the evaluation; and (i) configuring the vehicle user interface with the audio parameter settings.

In yet another embodiment, there is presented a method of configuring a vehicle user interface that provides hands-free use of a mobile communications device by a vehicle operator, comprising the steps of (a) establishing a wireless link between a mobile communications device located at a vehicle and a vehicle user interface in the vehicle; (b) obtaining at the vehicle user interface an identifier from the mobile communications device; (c) determining that the vehicle user interface has one or more stored audio settings for the mobile communications device associated with the identifier; and (d) configuring the vehicle user interface with the one or more stored audio settings such that audio sent between a vehicle occupant and the mobile communications device via the vehicle user interface is processed using the one or more stored audio settings.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The method described below is directed to different embodiments of an approach for configuring a vehicle user interface that provides hands-free use of a mobile communications device by a vehicle operator. There are a variety of mobile communications devices used by vehicle operators; however, these devices may employ different strategies to reduce the effects of communications disturbances. Hence, when these devices are used with a vehicle user interface that provides hands-free use, the level of noise, echo, and equalization may vary depending on the specific mobile device used which may not provide a comfortable communications experience to the vehicle operator. The disclosed methods may provide a specific and targeted option of noise reduction, echo cancelation, and better equalization for each mobile device used by the vehicle operator. The disclosed methods generally involve linking a mobile communications device located at a vehicle with a vehicle user interface in the vehicle; placing an evaluation phone call using the mobile communications device; and configuring at least one audio parameter of the vehicle user interface based on the evaluation call.

Communications System

Figure 1:
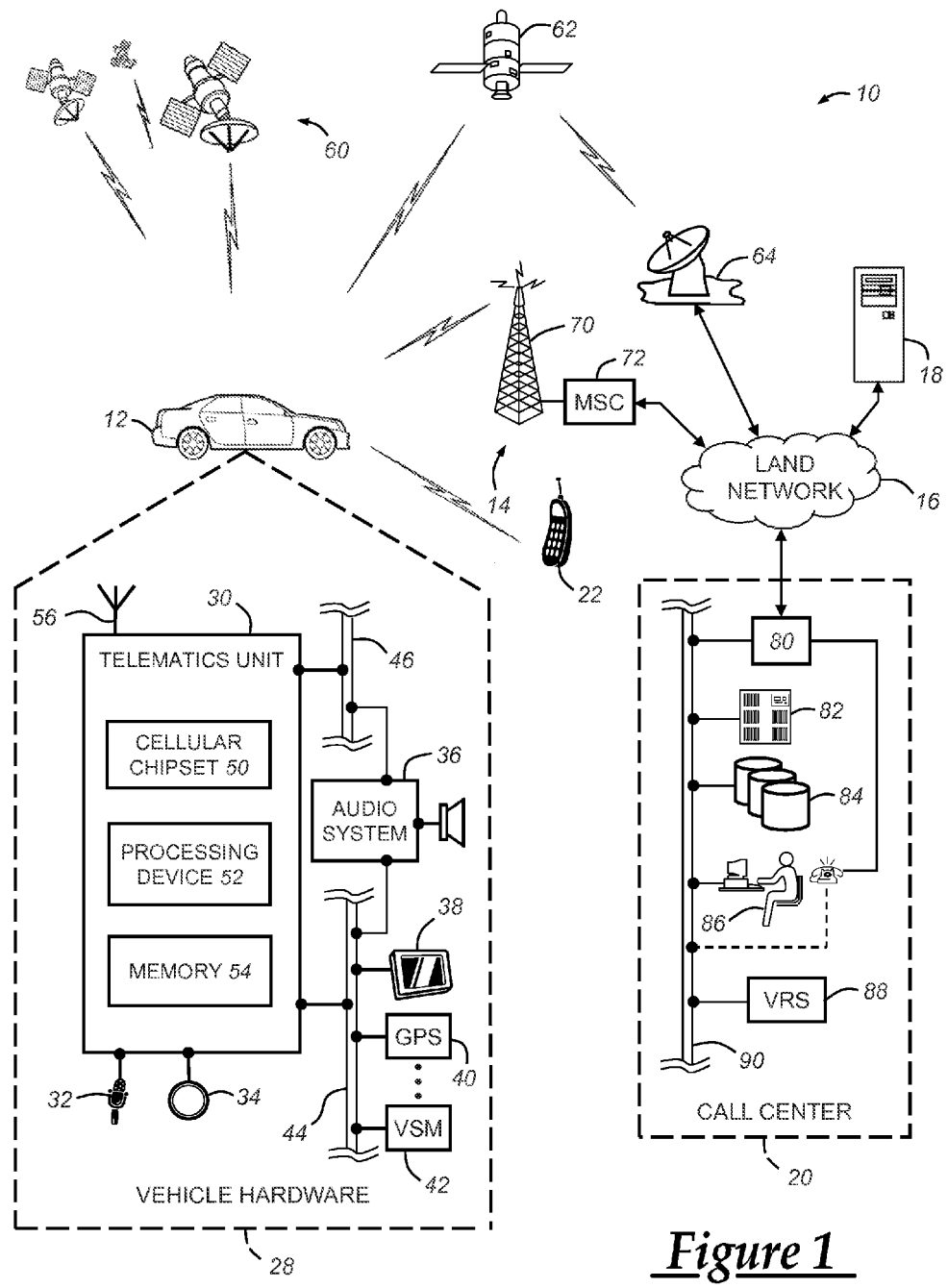
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

At least some of the vehicle user interfaces can include configurable settings, such as audio parameters for one or more purposes such as noise cancellation, improved ASR for audio received via microphone 32, and improved clarity of audio presented via the audio system 36. These audio settings can be configured under program control, either in the telematics unit 30 or one of the other VSMs 42. For microphone 32, whether it is connected to the telematics unit 30 as shown, or connected separately to the other vehicle hardware 28, it can be utilize a sound card or other input circuitry that permits the received input audio from the microphone to be altered based on one or more audio parameters, such as gain, smoothing, frequency cutoff filtering, bandpass filtering, etc. Similarly, similar features of outputted audio can be altered based on one or more audio parameters prior to being sent to the speaker(s). In some embodiments where, for example, the same audio system 36 and speaker(s) are used for both entertainment (e.g., music) and as a hands-free telephone interface, this configuration of the outputted audio can also be applied based on source so that, for example, the audio parameter(s) are used for configuring the audio presented during a hands-free telephone session, but are not used for music playback.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Apart from computer 18, other types of remotely located processing devices can be used. For example, a mobile device 22 can be used and can be one of a number of such communication devices used by subscribers. Each mobile device 22 is a processing device that can be used for one or more purposes, such as voice communication, text messaging, email, web browsing, gaming, camera, video recording, sending and receiving photos and videos, audio player (e.g., MP3), radio, GPS navigation, personal organizer, to name but a few. In the illustrated embodiment, mobile device 22 is a mobile phone also known as a cell or cellular phone that connects to a cellular network such as system 14. In another embodiment, mobile device 22 can be a personal digital assistant (PDA) that may or may not provide telephony services. Mobile device 22 can employ one of a variety of wireless technology including Bluetooth (e.g. hands-free headset, games, watches, sports sensors, medical devices, etc.), etc. Various other types of suitable processing devices will be apparent to those skilled in the art.

Figure 2:
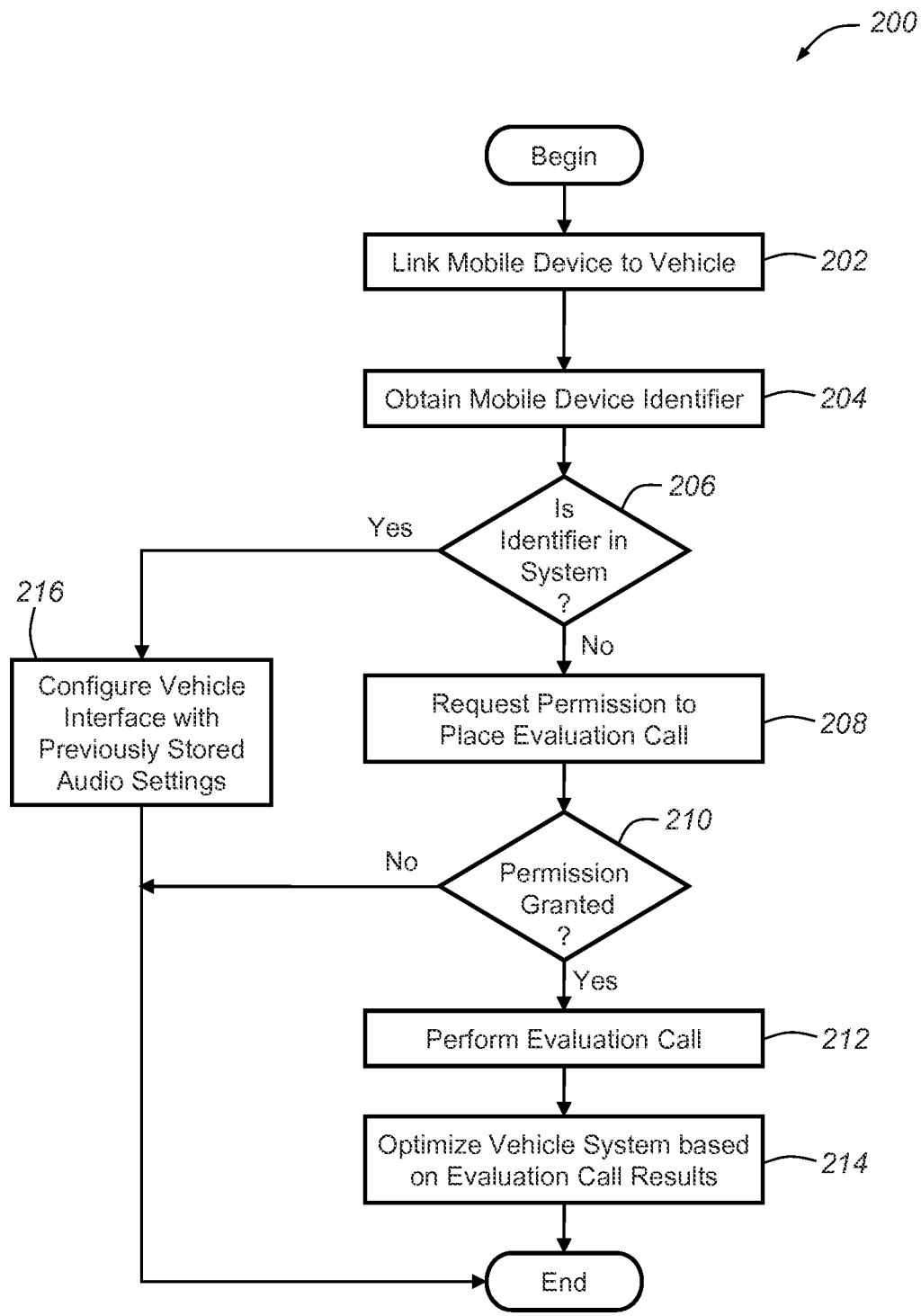
FIG. 2 is a flowchart depicting one embodiment of a method of configuring a vehicle user interface that provides hands-free use of a mobile communications device by a vehicle operator.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used. Method Turning now to FIG. 2, there is shown a method 200 for configuring a vehicle user interface that provides hands-free use of a mobile communications device by a vehicle operator. The method can be implemented by suitable programming of modules within the vehicle hardware 28 shown in FIG. 1 to carry out the method 200, and such programming is within the level of skill in the art. Method 200 starts at step 202 and begins by linking mobile device 22 located at the vehicle with a vehicle user interface. This can be done wirelessly using short range wireless communication. In one embodiment, either the telematics unit 30 or a separate vehicle VSM 42 pairs mobile communications device 22 such as a mobile phone to a vehicle user interface module using a Bluetooth connection. The Bluetooth connection can employ Gaussian frequency shift keying (GFSK), phase shift keying (PSK), and/or other modulation at the industrial, scientific and medical (ISM) frequency of 2.4 GHz, for example. Skilled artisans should appreciate that other connection methods can be employed. Once connected, the vehicle user interface will be able to provide hands-free use of the mobile phone, in this case. Hence, the vehicle operator will speak via vehicle microphone 32, listen via audio system 36, and in some embodiments be able to view visually presented material via visual display 38.

Next, at step 204 the vehicle obtains at least one mobile device identifier. The list of possible identifiers includes device manufacturer, model, type (e.g., smart phone), identification number (e.g., Bluetooth address, phone number, etc.), and/or other identifiers. Continuing with the embodiment of the previous step, the identifier can be obtained via the Bluetooth connection. In one embodiment, method 200 obtains a unique identifier that includes a Bluetooth address for the mobile device 22. In another embodiment, method 200 obtains one or more identifiers including device manufacturer and model. Skilled artisans should appreciate that other embodiments are also possible.

At step 206, the vehicle checks to determine the identifier is in the system. In one embodiment, the mobile device identifier is compared by processing device 52 against a list of addresses stored in memory 54. In the event the identifier is already included in the list of identifiers, then the vehicle obtains from its memory previously stored audio settings that are associated with that mobile device identifier and at step 216 configures the vehicle user interface using those audio settings. The method 200 then ends at step 215. However, if the identifier is not listed, then the vehicle user interface needs to be configured for the mobile device 22 associated with the identifier, and so the method 200 proceeds to the next step 208.

At step 208, method 200 requests permission from the vehicle operator to place an evaluation call. In one embodiment, method 200 requests permission to place an evaluation call between mobile device 22 and telematics unit 30 which is located in vehicle 12. The permission request can be played to the driver via one or more components including audio system 36 (e.g., prerecorded and stored voice request at memory 54), visual display 38 (e.g., previously stored text message, video, etc.), a combination of both, and/or other components. However, in one embodiment, step 208 can be optional and no request for permission is required. In another embodiment, the permission request can be previously made at an earlier event including purchasing or leasing the vehicle, subscribing to a vehicle related service (e.g., telematics service), etc.

At step 210, method 200 checks if a permission to place an evaluation phone call is provided. If the permission is granted then method 200 proceeds to the next step. However, where permission is not granted then method 200 ends. As with step 208, this step can be optional and/or determined at a previous event as discussed herein. The permission can be received via one or more components of the vehicle user interface including microphone 32, display screen 38, pushbutton or control input 34, a combination of components, and/or other components.

Figure 3:
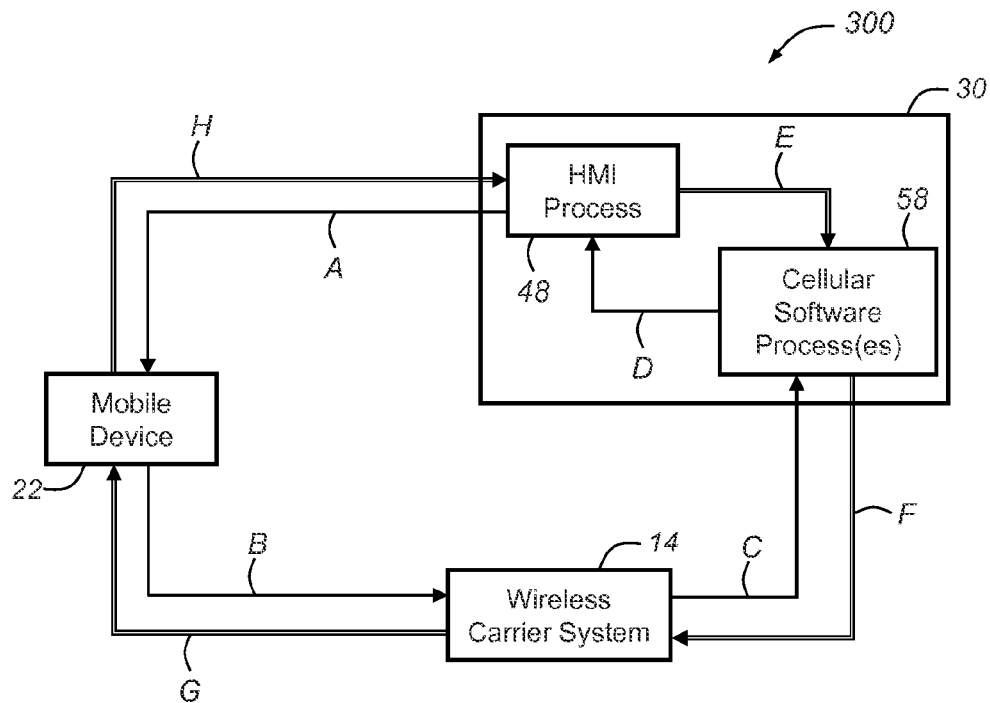
FIG. 3 is a block diagram depicting one embodiment of an exemplary system and method of providing an evaluation call between a vehicle telematics unit and a mobile communications device.

At step 212, an evaluation call is established between mobile communications device 22 and vehicle 12. In one embodiment depicted in FIG. 3, the evaluation call is a voice telephone call established between mobile device 22 and telematics unit 30. In this case, the evaluation call starts at step A where audio data is sent from telematics unit 30 to mobile communication device 22 via a Bluetooth or other short range wireless connection. The audio data may be any audio data used for testing communication signals including artificial voices (e.g., ITU-T P.50), real speech, recorded real speech, etc. Then, at steps B and C the audio data travels via wireless carrier system 14 back to the telematics unit 30. In the illustrated embodiment of FIG. 3, the telematics unit 30 can include separate software processes, one of which handles cellular telephony (58) and the other of which is a human-machine interface (HMI) 48 that comprises part of the vehicle user interface. The received audio data may be sent or otherwise provided internally at step D in digital form for analysis by HMI process 48. The analysis may compare the original sent audio data to the recently received data. Various audio parameters may be analyzed including noise, send level, receive level, echo, send/receive equalization, etc. The audio parameters levels, values, magnitude, spectral variations, etc. of the original audio data may be compared to those of the received audio data. Skilled artisans should appreciate that any adequate audio means can be used to analyze the audio data including P.52, P.56, and/or other tools. Additionally, step 212 may also encompass sending a second audio data in the reverse direction from telematics unit 30 over cellular communication system 14 and receiving the second audio data at mobile communication device 22. For example, in one embodiment depicted in FIG. 3, second audio data is sent from telematics unit 30 initiated by HMI process 48 (step E). Then, at step F the audio data travels to wireless carrier system 14. At step G, the audio data reaches mobile communication device 22. From there, the audio data is sent to telematics unit 30 via the short range wireless communication (step H) where it is analyzed via HMI process 48. Again, the analysis may compare the original sent audio data to the received data to determine various differences such as those mentioned above (sound levels, spectral variations, etc.). Even though FIG. 3 shows that telematics unit 30 utilizes separate processes 48 and 58, it will be appreciated that they can be combined into a single software process. Moreover, rather than being carried out by telematics unit 30, another VSM 42 or other suitable circuitry of the vehicle hardware 28 can be used for this purpose.

Figure 4:
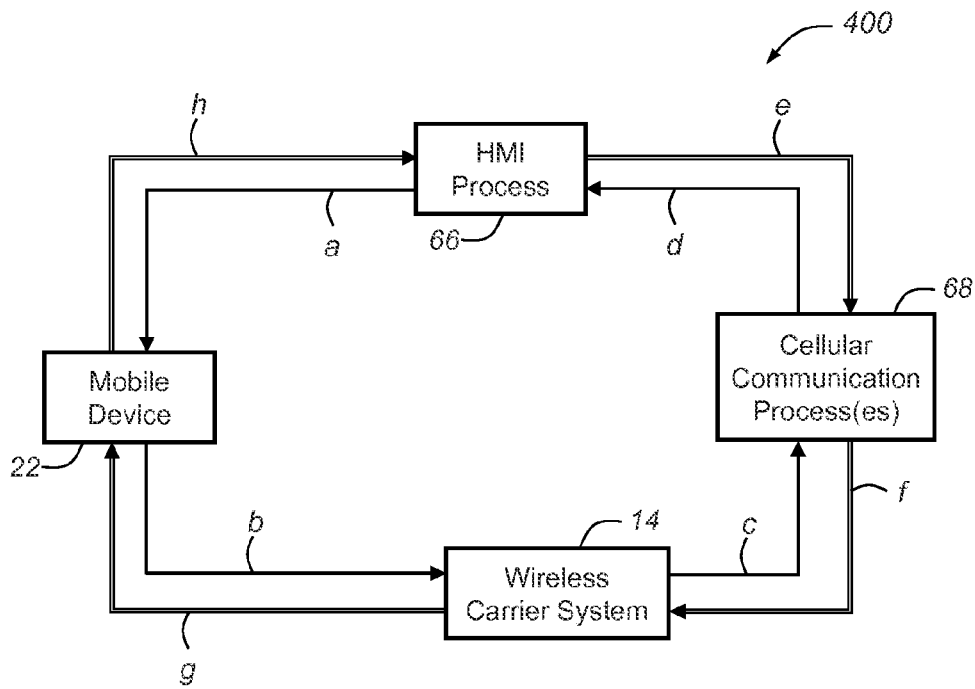
FIG. 4 is a block diagram depicting a second embodiment of an exemplary system and method of providing an evaluation call between a vehicle communication system and a mobile communications device.

Yet another embodiment of step 212 is depicted in FIG. 4. The steps a-h of this embodiment are in common with or similar to that of steps A-H of FIG. 3 and may be carried out as described above. This embodiment differs from that of FIG. 3 in that the telematics unit and vehicle user interface are physically separate hardware components that communicate with each other over one of the vehicle's communication buses. The telematics unit 30 carries out the cell communication process 68, whereas the HMI process 66 is carried out by the vehicle user interface. In addition to sending the test audio data from the mobile device 22 to the telematics unit over the wireless carrier system (steps a-d), the process of FIG. 4 may also send test audio data in the reverse direction (steps e-h).

Skilled artisans should appreciate that it may be helpful to remove the effects introduced by telematics unit 30 and its wireless network provider to more accurately estimate one or more audio settings for mobile device 22. In one embodiment, telematics unit 30 and its wireless network provider can be tested beforehand at an earlier event including purchasing or leasing the vehicle, subscribing to a vehicle related service (e.g., telematics service), etc. Skilled artisans should also appreciate that if telematics unit 30 is not equipped with a phone communication capability then a call can be made via a test phone, for example, located at call center 20. Furthermore, during the evaluation call described herein and while performing step 212, the network (e.g., GSM, CDMA, etc.) used by mobile device 22 can be identified. Specific features related to the network like voice encoding, noise gating, etc. could be determined based on differences between the sent and received data. In one embodiment, attributes of AMR encoding and EVRC encoding can be identified to determine which network is used. Knowing the network used can promote a better communication quality by enabling the system to select audio parameters specifically selected for that particular network. In one embodiment, parametric equalization settings (PEQs), which are used on the send and receive side of a hands-free communication, are used to adjust communications curves, eliminating nulls, adding/reducing gain at specific frequency bands, etc. to enable optimal communication quality. Therefore, knowing a specific network used can entitles using specific PEQs settings to optimize the communication quality for a combination of specific network and vehicle hardware 28. For instance, a lower noise reduction setting could be used for a GSM network versus a CDMA network. In one embodiment and based on the evaluation call performed described herein, the noise reduction and echo cancellation settings on the linked mobile device 22 to vehicle 12 can be checked to confirm that they are disabled by sending a series of signals (e.g., signal and noise) to verify that the noise reduction is switched off. Similarly, echo cancelation of mobile device 22 can be checked to confirm that it is disabled by evaluating the echo picked up from vehicle 12 audio system 36.

At step 214, method 200 optimizes the vehicle user interface based on evaluation call results. Once one or more audio parameters levels are determined for a specific mobile device 22 per the previous step 212 then they can be adjusted for a better communication experience. The audio parameters values/algorithms used may be transmission-direction independent (i.e., the same values/algorithms used both in sending or receiving audio via the vehicle user interface), or may be direction-specific such that are set of values (e.g., gain) is used for speech sent from the vehicle user interface to the mobile device and another set is used for speech sent in the other direction between the two devices. In one embodiment, this configuration involves programming audio system 36 to reduce the noise level, echo level, and equalizes the sound levels. Similar adjustments to the signal produced by the microphone 32 may be made. In this way, the vehicle user interface may be provided with a configuration that is customized for the particular mobile device being used. Any techniques known in the art can be used to reduce the noise level including short time spectral attenuation, power spectral subtraction, spectral amplitude subtraction, Wiener filters, and/or other filters. Techniques used for echo cancelation includes finite impulse response (FIR) filters, least mean squares (LMS) filters (e.g., multi delay filter (MDF), generalized MDF (GMDF)), recursive least squares (RLS) filters (e.g., fast Kalman, fast transversal filter (FTF), fast Newton transversal filter (FNTF)), affine projection filters (e.g., fast affine projection FAP), etc. Some techniques that can be used for equalization include any filtering technique (e.g., low pass, high pass, band pass), peak equalizer (e.g., parametric equalizer, quasi-parametric, semi-parametric, etc.), shelving equalizer (e.g., low shelf, high shelf), etc. Furthermore, some techniques may be applied to control two or more audio parameters; thus, providing a global technique including optimal filter and its derivatives (e.g. cascaded structure, dual structure, parallel structure, etc.), filters combinations (e.g. adaptive filter and post filtering, etc.), etc. Skilled artisans should appreciate that other techniques and filters not mentioned herein may be also employed. The audio parameters may then be associated with their corresponding mobile communications device identifier and stored, for example, in memory 54. Then, in the future when mobile device 22 is detected in vehicle 12 via the mobile device identifier, vehicle 12 optimizes its audio system 36 by configuring its vehicle user interface with one or more associated audio parameters.

Separate configurations of audio parameters may be established for each different mobile device paired or linked to the vehicle user interface. Then, upon detecting a previously-configured mobile device based on its unique identifier, the HMI process may automatically configure itself with the audio parameters associated with that identifier.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of configuring a vehicle user interface that provides hands-free use of a mobile communications device by a vehicle operator, comprising the steps of:
   (a) establishing a short range wireless communication (SRWC) link between a mobile communications device located at a vehicle and a vehicle user interface in the vehicle;
   (b) wirelessly transmitting audio data from a telematics unit in the vehicle that is associated with the vehicle user interface, wherein the audio data in a first instance is received by the mobile communications device via one of the SRWC link or a cellular transmission between the telematics unit and the mobile communications device and then in a second instance is received by the telematics unit from the other of the SRWC link or the cellular transmission between the telematics unit and the mobile communications device, wherein:
      if the audio data is transmitted to the mobile communications device via the SRWC link in the first instance, the audio data is received by the telematics unit via the cellular transmission in the second instance, or
      if the audio data is transmitted to the mobile communications device via the cellular transmission in the first instance, the audio data is received by the telematics unit via the SRWC link in the second instance; and
   (c) configuring at least one audio parameter of the vehicle user interface based on the audio data received by the telematics unit from the other of the SRWC link or the cellular transmission between the telematics unit and the mobile communications device.

2. The method of claim 1, wherein the mobile device is a mobile phone.

3. The method of claim 2, wherein step (a) comprises pairing the mobile phone to the vehicle user interface, wherein the SRWC link is Bluetooth.

4. The method of claim 1, wherein the method further comprises, prior to step (b), the steps of: obtaining at least one identifier from the mobile communications device, determining if the vehicle user interface already has a configured audio parameter associated with the identifier, and if not, then carrying out steps (b) and (c) and associating the configured audio parameter with the identifier.

5. The method of claim 4, wherein the method further comprises, prior to step (b) the step of obtaining permission from the vehicle operator to place an evaluation call during which step (b) is then carried out.

6. The method of claim 1, wherein step (b) further comprises transmitting the audio data from the mobile communications device to a call center associated with the vehicle telematics service.

7. The method of claim 1, wherein step (b) further comprises the steps of: after transmitting the audio data from the telematics unit, receiving the audio data back at the vehicle user interface, and analyzing the transmitted and received audio data, and wherein step (c) further comprises setting the one or more audio parameters based on the analysis.

8. The method of claim 1, wherein the vehicle user interface is integrated into the telematics unit.

9. The method of claim 1, wherein the vehicle user interface and telematics unit comprise separate modules that communicate with each other via a vehicle bus.

10. The method of claim 1, wherein step (b) further comprises sending audio data from the mobile communications device to the telematics unit over a cellular communications system, sending audio data from the telematics unit to the mobile communications device over the cellular communications system, and analyzing the sent and received data.

11. The method of claim 10, wherein step (a) comprises pairing the mobile communications device to the vehicle user interface using a Bluetooth connection, and wherein audio data sent to the telematics unit by the mobile communications device over the cellular communications system is obtained by the mobile communications device from the vehicle via the Bluetooth connection, and wherein audio data received by the mobile communications device from the telematics unit over the cellular communications system is sent to the vehicle via the Bluetooth connection.

12. The method of claim 10, wherein the audio data is a speech file.

13. The method of claim 10, wherein the analysis step further comprises evaluating a plurality of audio parameter levels including noise, echo, and equalization.

14. The method of claim 10, wherein the cellular transmission is over a GSM or CDMA network.

15. The method of claim 10, wherein the analysis step involves using an ITU-T P.56 tool.

16. The method of claim 1, wherein step (c) further comprises associating the one or more audio parameters with the mobile communications device and storing the one or more audio parameters in the vehicle user interface.

17. A method of configuring a vehicle user interface that provides hands-free use of a mobile communications device by a vehicle operator, comprising the steps of:
- (a) pairing a mobile communications device located at a vehicle with a vehicle user interface via a short range wireless communication (SRWC) link;
- (b) obtaining at least a mobile communications device identifier via the SRWC link;
- (c) determining that the vehicle user interface has not been configured for the mobile communications device associated with the identifier;
- (d) placing a first evaluation phone call from a vehicle telematics unit associated with the vehicle user interface to a mobile communications device using a cellular communications system, wherein the evaluation call carries first audio data, wherein the mobile communications device thereafter provides the first audio data to the telematics unit via the SRWC link;
- (e) analyzing the first audio data;
- (f) based on an audio data analysis of the first audio data, evaluating a plurality of audio parameter levels, and determining audio parameter settings based on the evaluation; and
- (g) configuring the vehicle user interface with the audio parameter settings.

18. The method of claim 17 further comprising originating a second evaluation call at the telematics unit, wherein the second evaluation call includes second audio data, wherein the mobile communications device receives the second audio data from the telematics unit via SRWC and thereafter sends the second audio data to the telematics unit using the cellular communications system.

19. The method of claim 18, wherein the first audio data and the second audio data is the same audio data.

20. The method of claim 18 further comprising analyzing the second audio data, wherein the audio data analysis of step (f) further includes analysis of the second audio data.

\* \* \* \* \*